(12) United States Patent
Ishikawa et al.

(10) Patent No.: US 12,461,732 B2
(45) Date of Patent: Nov. 4, 2025

(54) OTA MASTER, SYSTEM, METHOD, NON-TRANSITORY STORAGE MEDIUM, AND VEHICLE

(71) Applicant: TOYOTA JIDOSHA KABUSHIKI KAISHA, Toyota (JP)

(72) Inventors: Tomoyasu Ishikawa, Nagoya (JP); Shunsuke Tanimori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/663,688

(22) Filed: May 17, 2022

(65) Prior Publication Data

US 2022/0405083 A1 Dec. 22, 2022

(30) Foreign Application Priority Data

Jun. 22, 2021 (JP) ................................ 2021-103411

(51) Int. Cl.
*G06F 8/65* (2018.01)
*G06F 8/60* (2018.01)

(52) U.S. Cl.
CPC . *G06F 8/65* (2013.01); *G06F 8/60* (2013.01)

(58) Field of Classification Search
None
See application file for complete search history.

(56) References Cited

U.S. PATENT DOCUMENTS

| | | | |
|---|---|---|---|
| 2003/0120913 A1* | 6/2003 | Wu | G06F 8/65 713/100 |
| 2014/0101651 A1* | 4/2014 | Li | G06F 8/656 717/171 |
| 2015/0178063 A1* | 6/2015 | Narkinsky | G06F 8/658 717/168 |
| 2022/0179644 A1* | 6/2022 | Harata | G06F 8/65 |

FOREIGN PATENT DOCUMENTS

| | | |
|---|---|---|
| JP | 2004-326689 A | 11/2004 |
| JP | 2020-135578 A | 8/2020 |
| JP | 2021-022018 A | 2/2021 |
| WO | WO 2020/170407 A1 | 8/2020 |

* cited by examiner

*Primary Examiner* — Jason D Mitchell
(74) *Attorney, Agent, or Firm* — Oblon, McClelland, Maier & Neustadt, L.L.P.

(57) ABSTRACT

An OTA master includes one or more processors configured to: receive, from a center, first type update data for a first electronic control unit on which a first type non-volatile memory having one storage area is mounted, and second type update data for a second electronic control unit on which a second type non-volatile memory having two storage areas is mounted, the first electronic control unit and the second electronic control unit being included in a plurality of electronic control units mounted on a vehicle; and control software update for a plurality of target electronic control units of which pieces of software are to be updated among the electronic control units mounted on the vehicle, based on the first type update data and the second type update data.

5 Claims, 8 Drawing Sheets

| ECU ID | MEMORY TYPE |
|---|---|
| aaaa | SECOND TYPE (DUAL-BANK) |
| bbbb | SECOND TYPE (DUAL-BANK) |
| cccc | FIRST TYPE (SINGLE-BANK) |
| dddd | FIRST TYPE (SINGLE-BANK) |
| ... | ... |

OTA MASTER, SYSTEM, METHOD, NON-TRANSITORY STORAGE MEDIUM, AND VEHICLE

CROSS-REFERENCE TO RELATED APPLICATION

This application claims priority to Japanese Patent Application No. 2021-103411 filed on Jun. 22, 2021, incorporated herein by reference in its entirety.

BACKGROUND

1. Technical Field

The present disclosure relates to an OTA master, a system, a method, a non-transitory storage medium, and a vehicle.

2. Description of Related Art

A plurality of electronic control units used for controlling an operation of a vehicle is mounted on a vehicle. The electronic control unit includes a processor, a transitory storage unit, such as a random access memory (RAM), and a non-volatile memory which is a non-volatile storage unit, such as a flash read-only memory (ROM). A control function of the electronic control unit is implemented when the processor executes software stored in the non-volatile memory. Software stored in each electronic control unit is rewritable, and by updating to a newer version of the software, it is possible to improve a function of each electronic control unit or add a new vehicle control function.

An over-the-air (OTA) technology is known as a technology for updating software of an electronic control unit. In the OTA technology, a device that wirelessly connects an in-vehicle communication device connected to an in-vehicle network to a communication network, such as the Internet, and executes software update processing of the vehicle updates or adds the software of the electronic control unit by downloading software from a server via wireless communication and installing the downloaded software on the electronic control unit (see, for example, Japanese Unexamined Patent Application Publication No. 2004-326689.)

As types of non-volatile memories mounted on the electronic control unit, there are a memory (a single-bank memory) having one storage area used for storing data, such as software, and a memory (a dual-bank memory) having two storage areas used for storing data, such as software. The non-volatile memories may be properly used according to specifications or the like of the electronic control unit. An electronic control unit having the dual-bank memory mounted thereon can store two versions of data, old and new, in the two storage areas, respectively.

SUMMARY

In a campaign, which is an event for updating software for vehicles, there is a case where both an electronic control unit having a single-bank memory mounted thereon and an electronic control unit having a dual-bank memory mounted thereon are electronic control units of which software is to be updated. Due to structures of the memories, the electronic control unit having the single-bank memory mounted thereon and the electronic control unit having the dual-bank memory mounted thereon have different recovery methods when the update fails.

For this reason, when applying, to a vehicle, a campaign in which the electronic control unit having the single-bank memory mounted thereon and the electronic control unit having the dual-bank memory mounted thereon are mixed as the electronic control units to be updated, in a case where software update (installation and activation) is not executed according to a communication situation of an in-vehicle network connected to the electronic control units, it may take time to normally start the electronic control units after the software update.

The present disclosure provides an OTA master, a system, a method, a non-transitory storage medium, and a vehicle capable of executing software update for an electronic control unit adapted to a single-bank memory and a dual-bank memory.

An OTA master according to a first aspect of the present disclosure includes one or more processors configured to: receive, from a center, first type update data for a first electronic control unit on which a first type non-volatile memory having one storage area is mounted, and second type update data for a second electronic control unit on which a second type non-volatile memory having two storage areas is mounted, the first electronic control unit and the second electronic control unit being included in a plurality of electronic control units mounted on a vehicle; and control software update for a plurality of target electronic control units of which pieces of software are to be updated among the electronic control units mounted on the vehicle, based on the first type update data and the second type update data.

A system according to a second aspect of the present disclosure includes: a center including one or more first processors; and an OTA master including one or more second processors. The one or more first processors are configured to communicate with the OTA master, and transmit, to the OTA master, first type update data for a first electronic control unit on which a first type non-volatile memory having one storage area is mounted, and second type update data for a second electronic control unit on which a second type non-volatile memory having two storage areas is mounted, the first electronic control unit and the second electronic control unit being included in a plurality of electronic control units mounted on a vehicle. The one or more second processors are configured to receive the first type update data and the second type update data transmitted from the center, and control software update for a plurality of target electronic control units of which pieces of software are to be updated among the electronic control units mounted on the vehicle, based on the first type update data and the second type update data.

A method according to a third aspect of the present disclosure is executed by an OTA master that includes one or more processors and one or more memories. The method includes: receiving, from a center, first type update data for a first electronic control unit on which a first type non-volatile memory having one storage area is mounted and second type update data for a second electronic control unit on which a second type non-volatile memory having two storage areas is mounted, the first electronic control unit and the second electronic control unit being included in a plurality of electronic control units mounted on a vehicle; and controlling software update for a plurality of target electronic control units of which pieces of software are to be updated among the electronic control units mounted on the vehicle, based on the first type update data and the second type update data.

A non-transitory storage medium according to a fourth aspect of the present disclosure stores instructions that are executable by a computer of an OTA master which includes one or more processors and one or more memories, and that cause the computer to execute the method according to the third aspect.

A vehicle according to a fifth aspect of the present disclosure includes the OTA master according to the first aspect.

With the OTA master of the present disclosure, it is possible to execute software update (installation and activation) of an electronic control unit adapted to a single-bank memory and a dual-bank memory based on a communication situation of an in-vehicle network.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A network system of the present disclosure controls the order of installation and activation processing for update data for an electronic control unit having a single-bank memory mounted thereon and update data for an electronic control unit having a dual-bank memory mounted thereon in update data for electronic control units to be updated that is downloaded from a center.

EMBODIMENTS

Configuration

Figure 1:
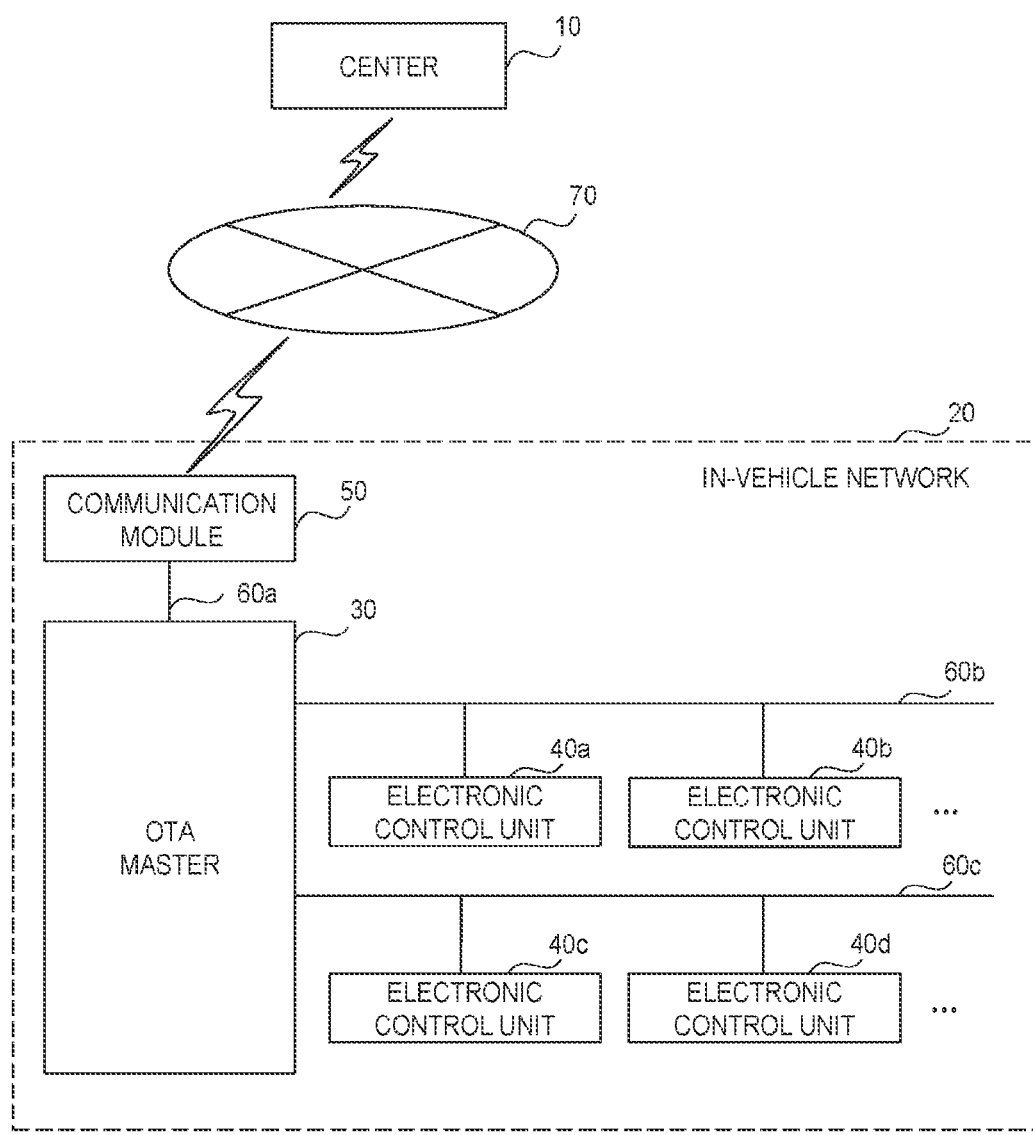
FIG. 1 is a block diagram illustrating an overall configuration of a network system according to an embodiment.

FIG. 1 is a block diagram illustrating an overall configuration of a network system according to one embodiment of the present disclosure. The network system illustrated in FIG. 1 is used for updating pieces of software of a plurality of ECUs 40a to 40d mounted on a vehicle, and includes a center 10 outside the vehicle and an in-vehicle network 20 constructed inside the vehicle.

(1) Center

The center 10 can communicate with an OTA master 30, described below and included in the in-vehicle network 20, via a network 70. The center 10 can control and manage the update of the pieces of the software of the ECUs 40a to 40d connected to the OTA master 30 by executing transmission of the update data of the pieces of the software of the ECUs 40a to 40d, reception of a notification indicating a proceeding situation of software update processing, or the like, with the OTA master 30. The center 10 functions as a so-called server.

Figure 2:
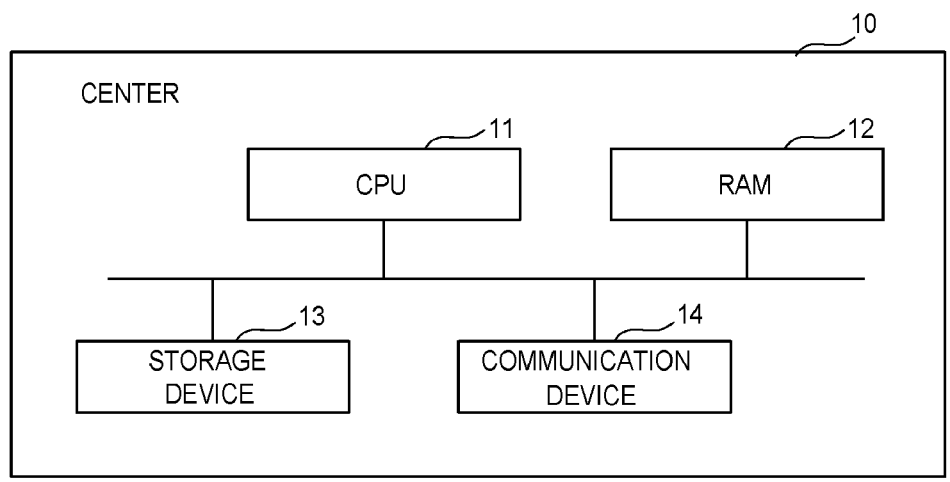
FIG. 2 is a block diagram illustrating a schematic configuration of a center.

FIG. 2 is a block diagram illustrating a schematic configuration of the center 10 in FIG. 1. As illustrated in FIG. 2, the center 10 includes a central processing unit (CPU) 11, a random access memory (RAM) 12, a storage device 13, and a communication device 14. The numbers of the CPUs 11, RAMs 12, storage devices 13, and communication devices 14 are not respectively limited to one. The storage device 13 includes a readable and writable storage medium, such as a hard disk drive (HDD) or a solid-state drive (SSD), and stores a program used for executing software update management, information used for software update control and the software update management, update data of a piece of software of each ECU, and the like. In the center 10, the CPU 11 executes predetermined processing for the software update by executing a program read from the storage device 13 using the RAM 12 as a work area. The communication device 14 is used for communicating with the OTA master 30 via the network 70.

Figure 3:
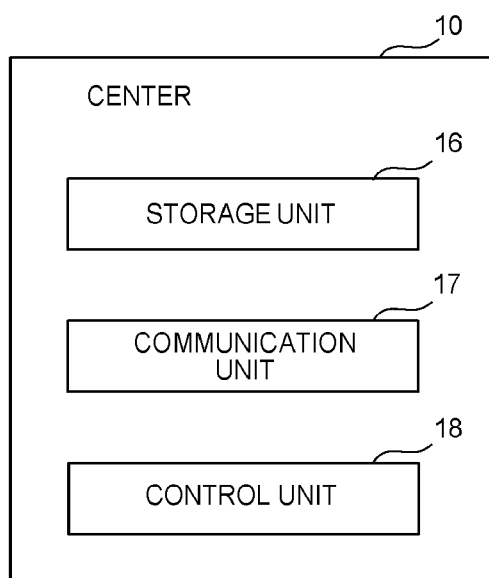
FIG. 3 is a functional block diagram of the center.

FIG. 3 is a functional block diagram of the center 10 illustrated in FIG. 2. The center 10 illustrated in FIG. 3 includes a storage unit 16, a communication unit 17, and a control unit 18. A function of the storage unit 16 is implemented by the storage device 13 illustrated in FIG. 2. Functions of the communication unit 17 and the control unit 18 are implemented when the CPU 11 illustrated in FIG. 2 executes a program stored in the storage device 13 using the RAM 12.

The storage unit 16 stores information on the software update processing of one or more ECUs mounted on the vehicle. As the information on the software update processing, the storage unit 16 stores at least update management information in which information indicating the pieces of the software that can be used in the ECUs 40a to 40d is associated with each piece of vehicle identification information (a vehicle ID) that identifies a vehicle, and the update data of the pieces of the software of the ECUs 40a to 40d. As the information indicating the software that can be used in the ECUs 40a to 40d, for example, a combination of latest version information of each piece of the software of the ECUs 40a to 40d is defined. Further, as the information on the software update processing, the storage unit 16 can store an update status indicating an update state of the software being executed in the vehicle. In addition, the storage unit 16 can store information (described below) on types of the non-volatile memories mounted on the ECUs 40a to 40d, respectively.

The communication unit 17 functions as a transmission unit and receiving unit that transmits and receives data, information, requests, and the like, to and from the OTA master 30. The communication unit 17 receives an update confirmation request of the software from the OTA master 30 (the receiving unit). The update confirmation request may be, for example, information transmitted from the OTA master 30 to the center 10 at a time when a power supply or an ignition is turned on (hereinafter, referred to as "power supply ON") in the vehicle, and is information for requesting a confirmation, from the center 10, whether update data for the ECUs 40a to 40d exists based on vehicle configuration information described below. Further, the communication unit 17 transmits information indicating whether the update data exists to the OTA master 30 in response to the update confirmation request received from the OTA master 30 (the transmission unit). Further, the communication unit 17 receives a transmission request (a download request) for the distribution package from the OTA master 30 (the receiving unit). Further, upon receiving the download request for the distribution package, the communication unit 17 transmits, to the OTA master 30, the distribution package containing the update data of the pieces of the software of the ECUs 40a to 40d.

When the communication unit 17 receives the update confirmation request from the OTA master 30, the control unit 18 determines, based on the update management information stored in the storage unit 16, whether the update data of the pieces of the software of the ECUs 40a to 40d mounted on the vehicle specified by the vehicle ID, which is included in the update confirmation request, exists. The determination result, by the control unit 18, on whether the update data exists is transmitted to the OTA master 30 by the communication unit 17. Upon determining that the update data of the pieces of the software of the ECUs 40a to 40d exists, the control unit 18 controls the update data to be transmitted to the OTA master 30 when receiving the download request for the distribution package from the OTA master 30.

(2) In-Vehicle Network

The in-vehicle network 20 includes the OTA master 30, the ECUs 40a to 40d, and a communication module 50. The OTA master 30 is connected to the communication module 50 via a bus 60a, connected to the ECUs 40a, 40b via a bus 60b, and connected to the ECUs 40c, 40d via a bus 60c.

The OTA master 30 can wirelessly communicate with the center 10 via the bus 60a and the communication module 50 by way of the network 70. The OTA master 30 has functions of managing an OTA state and executing the software update for an ECU to be updated (hereinafter, also referred to as a "target ECU") by controlling an update sequence which is a flow of the software update processing. Based on the update data and the like acquired from the center 10, the OTA master 30 controls the software update for the target ECU from among the ECUs 40a to 40d. The OTA master 30 may also be referred to as a central gateway (CGW).

Figure 4:
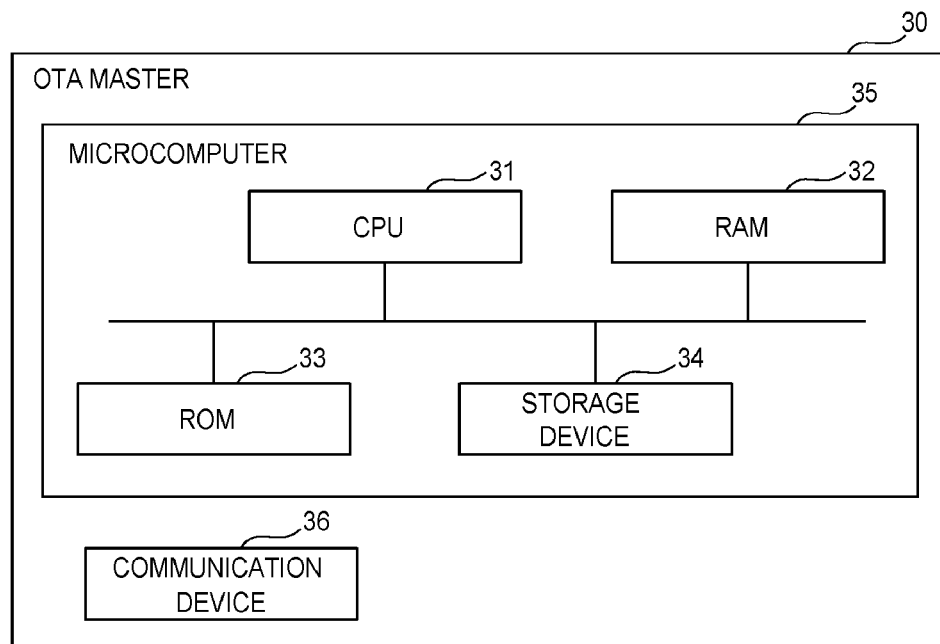
FIG. 4 is a block diagram illustrating a schematic configuration of an OTA master.

FIG. 4 is a block diagram illustrating a schematic configuration of the OTA master 30 in FIG. 1. As illustrated in FIG. 4, the OTA master 30 includes a CPU 31, a RAM 32, a read-only memory (ROM) 33, a storage device 34, and a communication device 36. The CPU 31, the RAM 32, the ROM 33, and the storage device 34 compose a microcomputer 35. The number of the microcomputers is not limited to one. In the OTA master 30, the CPU 31 executes predetermined processing for the software update by executing a program read from the ROM 33 using the RAM 32 as a work area. The communication device 36 is used for communicating with each of the communication module 50 and the ECUs 40a to 40d via the buses 60a to 60c illustrated in FIG. 1.

Figure 5:
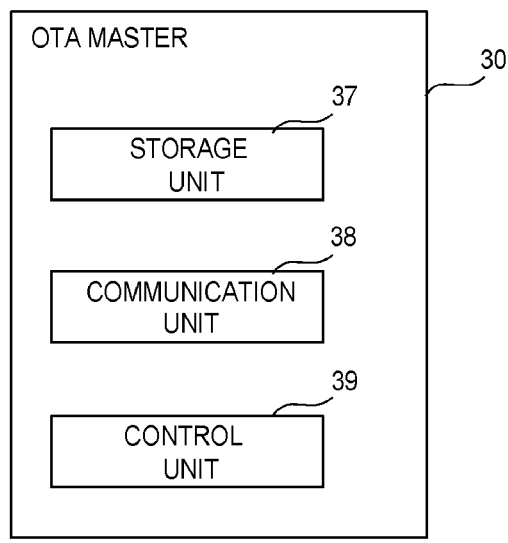
FIG. 5 is a functional block diagram of the OTA master.

FIG. 5 is a functional block diagram of the OTA master 30 illustrated in FIG. 4. The OTA master 30 illustrated in FIG. 5 includes a storage unit 37, a communication unit 38, and a control unit 39. A function of the storage unit 37 is implemented by the storage device 34 illustrated in FIG. 4. Functions of the communication unit 38 and the control unit 39 are implemented when the CPU 31 illustrated in FIG. 4 executes a program stored in the ROM 33 using the RAM 32.

In addition to a program (a control program of the OTA master 30) for updating the pieces of the software of the ECUs 40a to 40d or various pieces of data used when updating the pieces of the software, the storage unit 37 stores the update data of the software and the like that are downloaded from the center 10. Further, the storage unit 37 can store the information (described below) on the types of the non-volatile memories mounted on the ECUs 40a to 40d, respectively.

The communication unit 38 functions as a transmission unit and receiving unit that transmits and receives data, information, requests, and the like to and from the center 10. The communication unit 38 transmits the update confirmation request of the software to the center 10 at, for example, the time of power supply ON of the vehicle (the transmission unit). The update confirmation request includes, for example, a vehicle ID for identifying the vehicle and the information on the current versions of the pieces of the software of the ECUs 40a to 40d connected to the in-vehicle network 20. The vehicle ID and the current versions of the pieces of the software of the ECUs 40a to 40d are used for determining whether the update data of the pieces of the software of the ECUs 40a to 40d exists by comparing them with the latest software version held by the center 10 for each vehicle ID. Further, as a response to the update confirmation request, the communication unit 38 receives a notification indicating whether the update data exists from the center 10 (the receiving unit). When the update data of the pieces of the software of the ECUs 40a to 40d exists, the communication unit 38 transmits, to the center 10, a download request for the distribution package of the update data of the software (the transmission unit), and receives (downloads) the distribution package transmitted from the center 10 (the receiving unit). Further, the communication unit 38 transmits, to the center 10, the update state of the software transmitted by the ECUs 40a to 40d (the transmission unit).

The control unit 39 determines whether the update data of the pieces of the software of the ECUs 40a to 40d exists based on the response to the update confirmation request received by the communication unit 38 from the center 10. Further, the control unit 39 verifies, based on its own control, authenticity of the distribution package received (downloaded) by the communication unit 38 from the center 10 and stored in the storage unit 37. Further, the control unit 39 controls the software update processing (various types of verification, the installation, the activation, and the like) for the ECUs 40a to 40d using the update data received (downloaded) from the center 10. Specifically, the control unit 39 transfers, in a predetermined order, one or more pieces of update data downloaded in the distribution package to the target ECUs and causes the target ECUs to install the update software based on the update data. After the completion of the installation, the control unit 39 gives the target ECU an instruction on activation that makes the installed update software active in a predetermined order. At the time of the software update processing, the control unit 39 suitably controls procedures of the various types of verification, the installation, the activation, and the like on the ECUs 40a to 40d.

The ECUs 40a to 40d are devices used for controlling an operation of each part of the vehicle. FIG. 1 illustrates an example where the in-vehicle network 20 includes four ECUs 40a to 40d, but the number of ECUs is not particularly limited. For example, the OTA master 30 may be connected to a display device (an HMI) used for executing various displays, such as a display representing that the update data exists at the time of executing software update processing of the ECUs 40a to 40d, a display of an approval request screen for requesting approval for the software update from a user or a manager of the vehicle, and a display of a result of the software update. As the display device, for example, a car navigation system can be used. Further, the number of buses that connect the ECUs to the OTA master 30 is not particularly limited, either. For example, the above-described display device may be connected to the OTA master 30 via a bus other than the buses 60a to 60c.

Figure 6A:
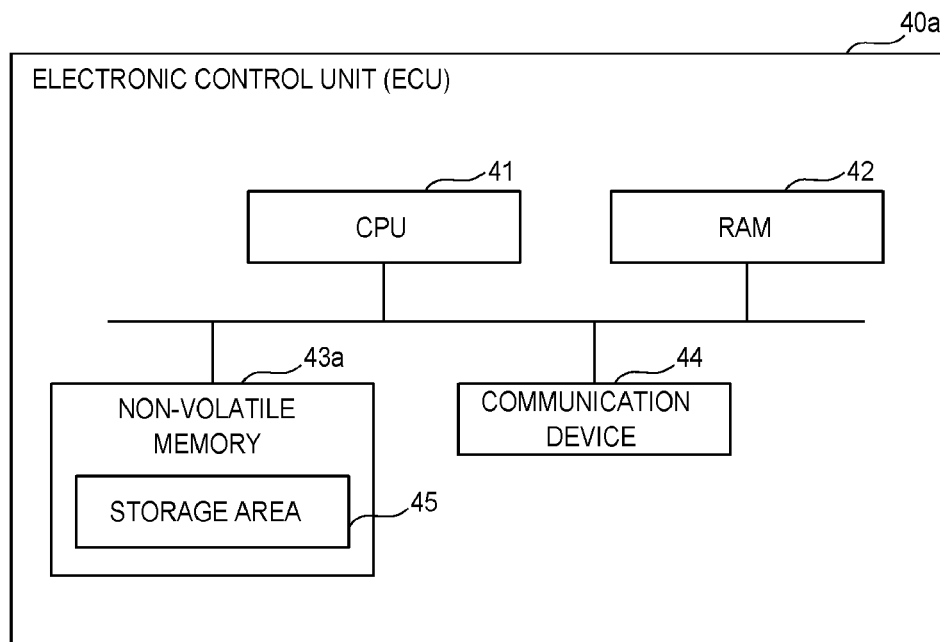
FIG. 6A is a block diagram illustrating an example of a schematic configuration of an electronic control unit.
Figure 6B:
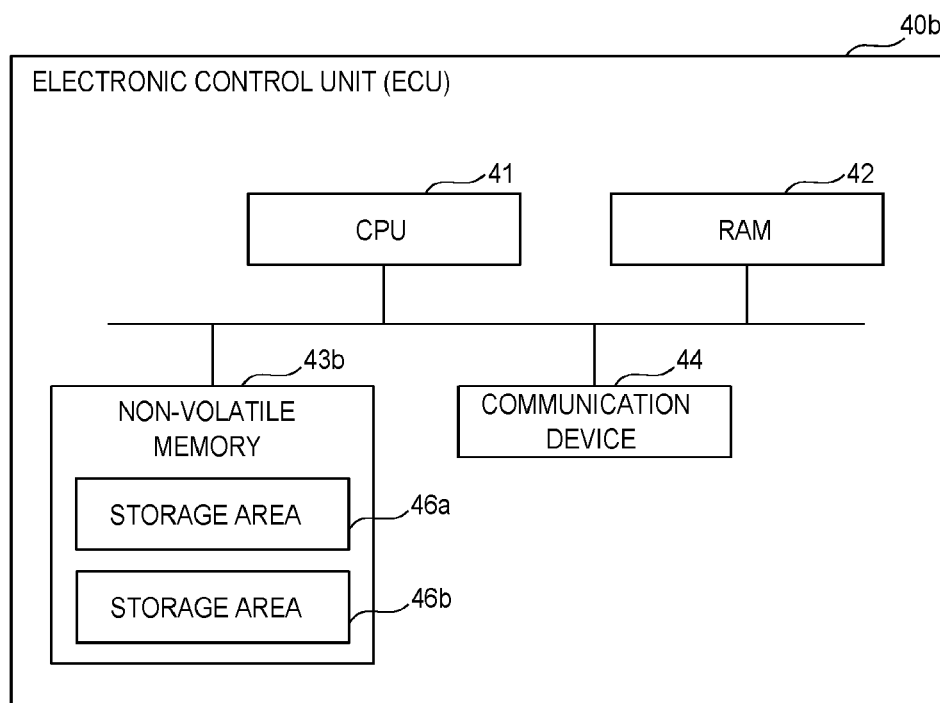
FIG. 6B is a block diagram illustrating another example of the schematic configuration of the electronic control unit.

Each of FIGS. 6A and 6B illustrates one example of a schematic configuration of the ECUs 40a to 40d.

The ECU 40a illustrated in FIG. 6A includes a CPU 41, a RAM 42, a non-volatile memory 43a, and a communication device 44. The CPU 41 implements a function of the ECU 40a by executing the program read from the non-volatile memory 43a using the RAM 42 as a work area. The non-volatile memory 43a is a memory (hereinafter, referred to as a single-bank memory) having one storage area 45 used for storing data, such as software. Hereinafter, a memory type of the non-volatile memory 43a configured to have the one storage area 45 is referred to as a "first type". In the storage area 45, in addition to the software used for implementing the function of the ECU 40a, version information, parameter data, a boot program for booting, a program for updating software, or the like may be stored. The communication device 44 is used for communicating with the OTA master 30 or the other ECUs 40b to 40d connected to the in-vehicle network 20.

Similar to the ECU 40a, the ECU 40b illustrated in FIG. 6B includes the CPU 41, the RAM 42, a non-volatile memory 43b, and the communication device 44. However, the non-volatile memory 43b mounted on the ECU 40b is a memory (hereinafter, referred to as a dual-bank memory) having two storage areas 46a, 46b used for storing data, such as software. Hereinafter, a type of the non-volatile memory 43b configured to have the two storage areas 46a, 46b is referred to as a "second type". In the storage areas 46a, 46b, in addition to the software used for implementing the function of the ECU 40b, version information, parameter data, a boot program for booting, a program for updating software, or the like, may be stored. The CPU 41 of the ECU 40b uses any one of the two storage areas 46a, 46b included in the non-volatile memory 43b as the storage area (an active bank) to be read, and executes software stored in the storage area to be read. In the other storage area (an inactive bank, a write bank) that is not to be read, the update software (an updated version program) can be installed (written) based on the update data on the background while software (the program) in the storage area (the active bank) to be read is being executed. In the software update processing, at the time of executing the activation (making the update software active), the update software can be activated by switching the storage area from which the program is read by the CPU 41 of the ECU 40b.

As a specific example, it is assumed that current software is stored in the storage area 46a of the non-volatile memory 43b, which is the dual-bank memory, and the update software is installed in the storage area 46b. For example, the ECU 40b can switch, upon receiving an instruction on activating the update software from the OTA master 30, the storage area (the active bank) to be read of the CPU 41 by switching a read start address of the CPU 41 from a head address of the storage area 46a to a head address of the storage area 46b, and can execute the update software installed in the storage area 46b. In the present disclosure, a configuration referred to as a "single-bank suspension memory" in which one storage area is pseudo-divided into two banks and software (a program) can be written on the one bank while the software (the program) stored on the other bank is being executed is also classified as the second type non-volatile memory.

Figures 7, 8:
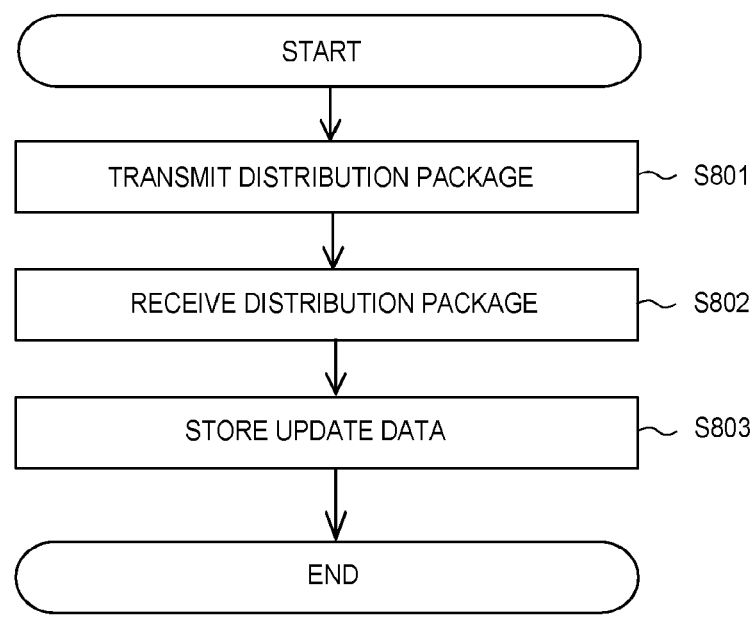
FIG. 7 is a diagram illustrating an example of type information.
FIG. 8 is a flowchart of download processing procedures according to a specific example 1 executed by the center and the OTA master.

FIG. 7 illustrates an example of the type information on the type of the non-volatile memory mounted on each of the ECUs 40a to 40d. In the type information exemplified in FIG. 7, an ECU JD, which is a number used for identifying the ECU, is associated with the type (the first type (the single-bank)/the second type (the dual-bank)) of the non-volatile memory mounted on the ECU. The type information is stored and managed in one or both of the storage unit 37 of the OTA master 30 and the storage unit 16 of the center 10. The type information may be generated in advance based on specifications of the ECUs 40a to 40d composing the in-vehicle network 20 and stored in the storage unit 37 of the OTA master 30 at the time of manufacturing the vehicle. Alternatively, the type information may be acquired by the OTA master 30 from the target ECU by communication inside the in-vehicle network 20 at the time of executing the software update processing. Alternatively, when the type information is managed by the center 10, the OTA master 30 may acquire the type information from the center 10 via the network 70.

The communication module 50 is a unit having a function of controlling communication between the center 10 and the vehicle, and is a communication device used for connecting the in-vehicle network 20 to the center 10. The communication module 50 is wirelessly connected to the center 10 by way of the network 70, and the OTA master 30 executes authentication of the vehicle, the download of the update data, or the like. The communication module 50 may be included in the OTA master 30.

Overview of Software Update Processing

At, for example, the time of the power supply ON of the vehicle, the OTA master 30 transmits the update confirmation request of the software to the center 10. The update confirmation request includes a vehicle ID used for identifying the vehicle and vehicle configuration information, which is information on a state of an ECU (a system configuration), such as current versions of hardware and the pieces of the software of the ECUs 40a to 40d connected to the in-vehicle network 20. The vehicle configuration information can be generated by acquiring identification numbers (ECU_ID) of the ECUs and identification numbers of the software versions (ECU_Software_ID) of the ECUs from the ECUs 40a to 40d connected to the in-vehicle network 20. The vehicle ID and the current versions of the pieces of the software of the ECUs 40a to 40d are used for determining whether the update data of the pieces of the software of the ECUs 40a to 40d exists by comparing them with the latest software version held by the center 10 for each vehicle ID. As a response to the update confirmation request received from the OTA master 30, the center 10 transmits a notification indicating whether the update data exists to the OTA master 30. When the update data of the pieces of the software of the ECUs 40a to 40d exists, the OTA master 30 transmits, to the center 10, the download request for the distribution package. In response to the download request received from the OTA master 30, the center 10 transmits, to the OTA master 30, the distribution package of the update data. In addition to the update data, the distribution package may contain verification data for verifying the authenticity of the update data, the number of pieces of update data, type information, various pieces of control information used at the time of the software update, or the like.

The OTA master 30 determines whether the update data of the pieces of the software of the ECUs 40a to 40d exists based on the response to the update confirmation request received from the center 10. Further, the OTA master 30 verifies the authenticity of the distribution package received from the center 10 and stored in the storage device 13. Further, the OTA master 30 transfers one or more pieces of update data downloaded in the distribution package to the target ECUs in a predetermined order and causes the target ECUs to install the update software. After the completion of the installation, the OTA master 30 gives the target ECU an instruction on activation that makes the installed updated version software active, in a predetermined order.

Further, in approval request processing, the OTA master 30 causes an output device to output a notification indicating that the approval for the software update is required or a notification prompting an input indicating that the software update has been approved. As the output device, a display device (not shown), provided on the in-vehicle network 20 and outputting a notification by a display, a voice output device (not shown) that outputs a notification by voice, or the like, can be used. For example, in the approval request processing, when the display device is used as the output device, the OTA master 30 can cause the display device to display an approval request screen used for requesting the approval for the software update from the user or the manager, or cause the display device to display a notification prompting a specific input operation, such as pressing of an approval button when the user or the manager approves the request. Alternatively, in the approval request processing, the OTA master 30 can cause the display device to display text, an icon, or the like, notifying that the update data of the pieces of the software of the ECUs 40a to 40d exists, or cause the display device to display restrictions and the like during the execution of the software update processing. Upon receiving the input indicating that the request has been approved from the user or the manager, the OTA master 30 executes control processing of the above-described installation and activation, and updates the software of the target ECU.

Here, when the installation and the activation on the target ECU are consecutively executed, the approval request processing for the software update is executed before the execution of the installation. On the other hand, when the installation and the activation on the target ECU are not consecutively executed, the approval request processing for the software update is executed at least after the execution of the installation and before the execution of the activation.

The software update processing is composed of a phase in which the OTA master 30 downloads the update data from the center 10 (a download phase), a phase in which the OTA master 30 transfers the downloaded update data to the target ECU and installs the update software based on the update data in the storage area of the target ECU (an installation phase), and a phase in which the target ECU makes the installed update software active (an activation phase).

The download is processing in which the OTA master 30 receives the update data for updating the software of the ECU transmitted from the center 10 and stores it in the storage unit 37. In the download, download of the update data for the ECU having the dual-bank memory using a predetermined distribution package mounted thereon and the update data for the ECU having the single-bank memory mounted thereon is executed. The download phase includes not only the execution of the download, but also control of a series of processes associated with the download, such as determining whether the download can be executed and verifying the update data.

The update data transmitted from the center 10 to the OTA master 30 may include any of the update software of the ECU (total data or difference data), the compressed data obtained by compressing the update software, and the divided data obtained by dividing the update software or the compressed data. Further, the update data may include the ECU_ID of the target ECU (or a serial number) and an ECU_Software_ID of the target ECU before the update. The downloaded distribution package can contain the update data for a single ECU or the update data for the ECUs.

The installation is processing in which the OTA master 30 writes, in an order determined in advance, the update software (the updated version program) on the non-volatile memory 43a and/or the non-volatile memory 43b of a plurality of target ECUs, based on the update data downloaded from the center 10. The installation is controlled based on whether the update data is for the ECU having the dual-bank memory mounted thereon or for the ECU having the single-bank memory mounted thereon. The installation phase includes not only the execution of the installation, but also control of a series of processes on the installation, such as determining whether the installation can be executed, transferring the update data, and verifying the update software.

When the update data includes the update software itself (the total data), in the installation phase, the OTA master 30 transfers the update data (the update software) to the target ECU. Further, when the update data includes the compressed data of the update software, difference data of the update software, or divided data of the update software, the OTA master 30 may transfer the update data to the target ECU and the target ECU may generate the update software from the update data, or the OTA master 30 may generate the update software from the update data and then transfer the update software to the target ECU. Here, the update software can be generated by decompressing the compressed data or assembling (integrating) the difference data or the divided data. These processes may be simply referred as transference of the update data to the target ECU.

The update software can be installed by the target ECU based on a request for the installation from the OTA master 30. A specific target ECU that has received the update data may autonomously execute the installation without receiving an explicit instruction from the OTA master 30.

The activation is processing in which the target ECU makes (activates) the update software installed on the non-volatile memory 43a and/or the non-volatile memory 43b active. The activation is controlled based on whether the update data is the update data for the ECU having the dual-bank memory mounted thereon or for the ECU having the single-bank memory mounted thereon. The activation phase includes not only the execution of the activation but also control of a series of processes associated with the activation, such as determining whether the activation can be executed, the approval request for the activation from the user or the manager of the vehicle, verifying the execution results.

The update software can be activated by the target ECU based on a request for the activation from the OTA master 30. A specific target ECU that has received the update data may autonomously activate after the completion of the installation without receiving an explicit instruction from the OTA master 30.

The software update processing can be executed continuously or in parallel to each of the target ECUs.

Further, the "software update processing" in the present specification includes not only processing for continuously executing all of the download, installation, and activation, but also processing for executing only a part of the download, installation, and activation.

Processing

Next, some specific examples on software update processing executed by the network system according to the present embodiment will be described with further reference to FIGS. 8, 9A, 9B, and 10.

(1) Specific Example 1 of Download

FIG. 8 is a flowchart describing processing procedures according to a specific example 1 of the download executed by the center 10 and the OTA master 30. The specific example 1 of the download exemplified in FIG. 8 is started when the center 10 receives the download request for the distribution package from the OTA master 30.

(Step S801) The center 10 transmits a distribution package containing update data of a target ECU of which software is to be updated to the OTA master 30. In this distribution package, update data for the ECU having the first type non-volatile memory (the single-bank memory) mounted thereon and update data for the ECU having the second type non-volatile memory (the dual-bank memory) mounted thereon may be mixed. When the distribution package is transmitted, the process proceeds to step 802.

(Step S802) The OTA master 30 receives the distribution package transmitted from the center 10. When the distribution package is received, the process proceeds to step S803.

(Step S803) The OTA master 30 stores the update data contained in the distribution package received from the center 10 in the storage unit 37. As such, the download processing ends.

(2) Specific Example 2 of Installation and Activation

Figure 9A:
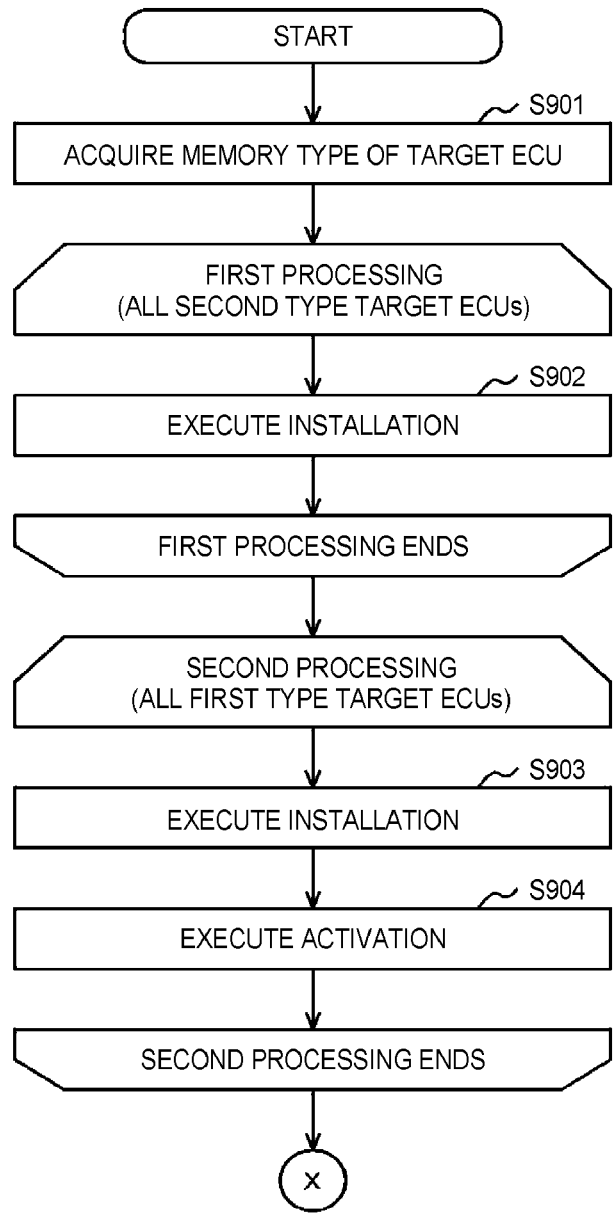
FIG. 9A is a flowchart of installation and activation processing procedures according to a specific example 2 executed by the OTA master and a target electronic control unit.
Figure 9B:
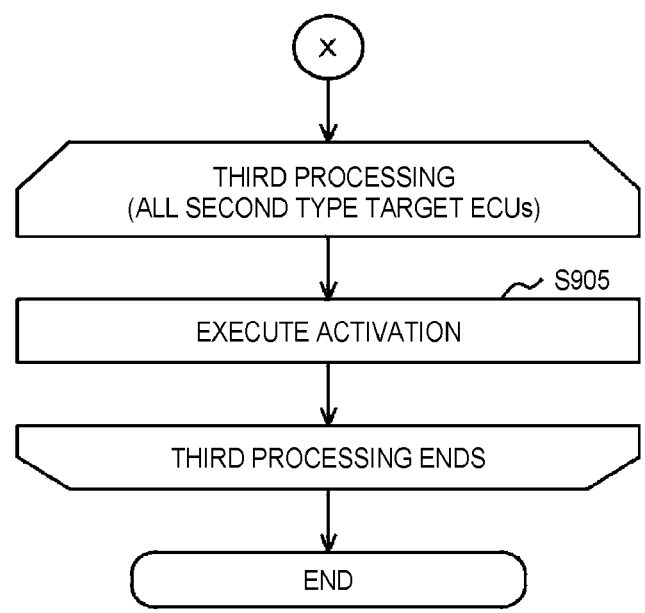
FIG. 9B is another flowchart of the installation and the activation processing procedures according to the specific example 2 executed by the OTA master and a target electronic control unit.

FIGS. 9A and 9B are flowcharts describing installation and activation processing procedures according to a specific example 2 executed by the OTA master 30 and the target ECU. The processes of FIG. 9A and the processes of FIG. 9B are connected by a combiner X. The specific example 2 of the installation and the activation exemplified in FIGS. 9A and 9B is started after the download of the update data is completed and when predetermined conditions (the installation can be executed, OK in verification of the update data, and the like) are satisfied.

(Step S901) The OTA master 30 acquires the memory type (the first type/the second type) of the non-volatile memory mounted on the target ECU. This memory type can be acquired by referring to the type information stored in the storage unit 37 when the OTA master 30 manages the memory type, or by referring to the information of the memory type that is contained in the distribution package and transmitted when the center 10 manages the memory type. When the memory type of the target ECU is acquired, the process proceeds to step S902.

(Step S902) The OTA master 30 transfers the update data (second type update data) to the second type target ECU having the second type non-volatile memory (the dual-bank memory) mounted thereon, and executes the installation, which is processing for writing the update software on a storage area of the ECU (first processing). The installation is executed continuously and/or in parallel on all the second type target ECUs. When the installation on all the second type target ECUs ends, the process proceeds to step S903.

(Step S903) The OTA master 30 transfers the update data (first type update data) to the first type target ECU having the first type non-volatile memory (the single-bank memory) mounted thereon, and executes the installation, which is the processing for writing the update software on a storage area of the ECU (second processing). The installation is executed continuously and/or in parallel on all the first type target ECUs. When the installation on all the first type target ECUs ends, the process proceeds to step S904.

(Step S904) The OTA master 30 and the first type target ECU execute activation for making the update software written on the storage area of the non-volatile memory of the first type target ECU active (the second processing). This activation is executed all at once or in a predetermined order for all the first type target ECUs on which the installation has ended. When the activation is executed in the predetermined order, the activation may be executed sequentially from the first type target ECU on which the installation has ended without waiting for the installation on all the first type target ECUs to end. When the activation of the update software on the first type target ECUs ends, the process proceeds to step S905.

(Step S905) The OTA master 30 and the second type target ECU execute activation for making the update software written on the storage area of the non-volatile memory of the second type target ECU active (third processing). This activation is executed all at once or in a predetermined order for all the second type target ECUs on which the installation has ended. When the activation of the update software on the second type target ECUs ends, this installation and activation processing ends.

According to the specific example 2 of the installation and the activation, the installation of the second type target ECU having a relatively low probability of an update failure is executed in advance, and the activation of the second type target ECU is executed after the installation and the activation of the first type target ECU. As such, the second type target ECU can be activated and started after the first type target ECU is normally updated, and thus it is possible to shorten a time until the software update is completed. The order of the installation and the activation of the target ECUs based on the above-described memory types may be stored in the storage unit 37 of the OTA master 30, or the OTA master 30 may acquire the order from the center 10 (for example, by transmitting the order contained in the distribution package).

(3) Specific Example 3 of Installation and Activation

Figure 10:
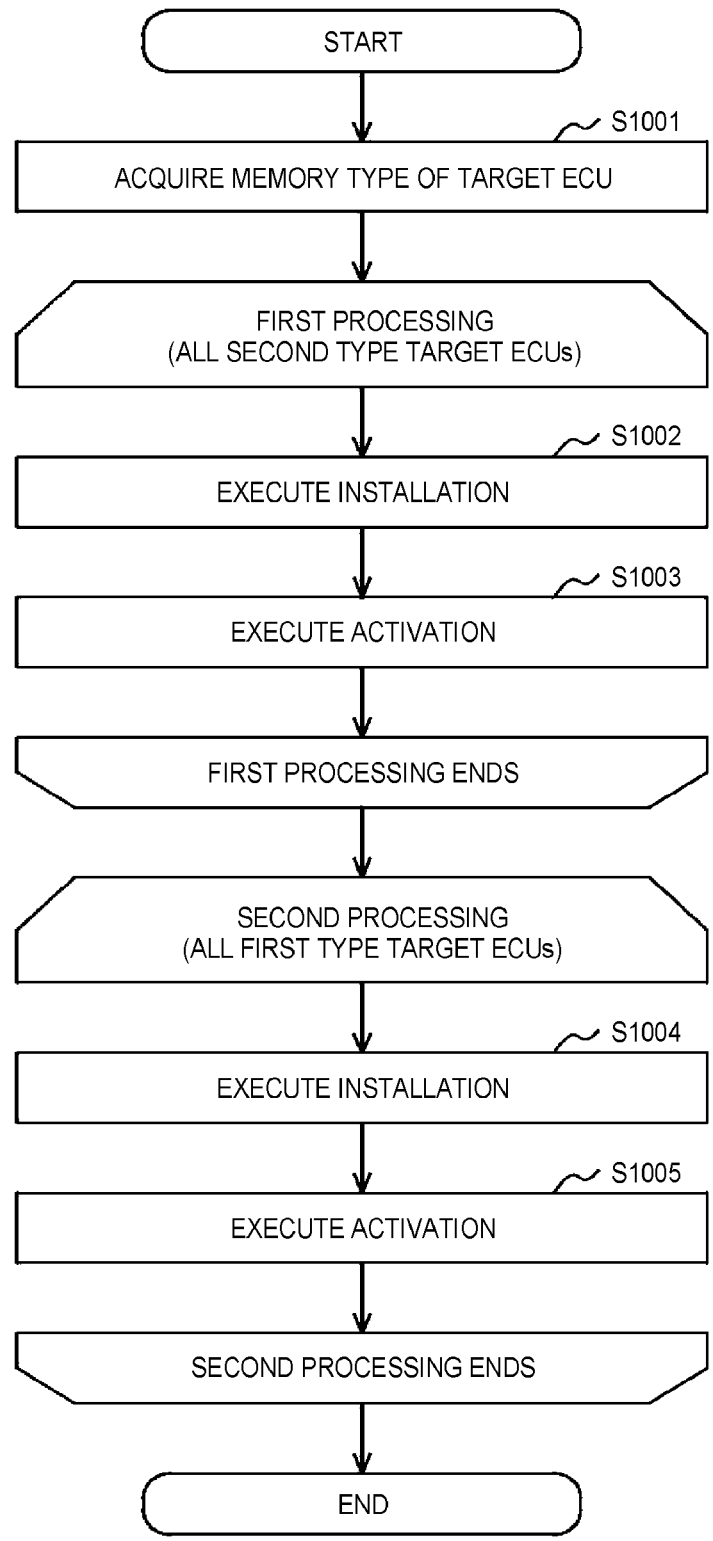
FIG. 10 is a flowchart of installation and activation processing procedures according to a specific example 3 executed by the OTA master and the target electronic control unit.

FIG. 10 is a flowchart describing installation and activation processing procedures according to a specific example 3 executed by the OTA master 30 and the target ECU. The specific example 3 of the installation and the activation exemplified in FIG. 10 is started after the download of the update data is completed and when the predetermined conditions (the installation can be executed, OK in verification of the update data, and the like) are satisfied.

(Step S1001) The OTA master 30 acquires the memory type (the first type/the second type) of the non-volatile memory mounted on the target ECU. This memory type can be acquired by referring to the type information stored in the storage unit 37 when the OTA master 30 manages the memory type, or by referring to the information of the memory type that is contained in the distribution package and transmitted when the center 10 manages the memory type. When the memory type of the target ECU is acquired, the process proceeds to step S1002.

(Step S1002) The OTA master 30 transfers the update data (the second type update data) to the second type target ECU and executes the installation, which is the processing for writing the update software on the storage area of the ECU (the first processing). The installation is executed continuously and/or in parallel on all the second type target ECUs. When the installation on all the second type target ECUs ends, the process proceeds to step S1003.

(Step S1003) The OTA master 30 and the second type target ECU execute the activation for making the update software written on the storage area of the non-volatile memory of the second type target ECU active (the first processing). This activation is executed all at once or in a predetermined order for all the second type target ECUs on which the installation has ended. When the activation is executed in the predetermined order, the activation may be executed sequentially from the second type target ECU on which the installation has ended without waiting for the installation on all the second type target ECUs to end. When the activation of the update software on the second type target ECUs ends, the process proceeds to step S1004.

(Step S1004) The OTA master 30 transfers the update data (the first type update data) to the first type target ECU and executes the installation, which is the processing for writing the update software on the storage area of the ECU (the second processing). The installation is executed continuously and/or in parallel on all the first type target ECUs. When the installation on all the first type target ECUs ends, the process proceeds to step S1005.

(Step S1005) The OTA master 30 and the first type target ECU execute activation for making the update software written on the storage area of the non-volatile memory of the first type target ECU active (the second processing). This activation is executed all at once or in a predetermined order for all the first type target ECUs on which the installation has ended. When the activation is executed in the predetermined order, the activation may be executed sequentially from the first type target ECU on which the installation has ended without waiting for the installation on all the first type target ECUs to end. When the activation of the update software on the first type target ECUs ends, this installation and activation processing ends.

The specific example 3 of the installation and the activation is especially useful when, in order to shorten the time until the software update is completed, the installation and the activation of the second type target ECU is prioritized over the installation and the activation of the first type target ECU. The order of the installation and the activation of the target ECUs based on the above-described memory types may be stored in the storage unit 37 of the OTA master 30, or the OTA master 30 may acquire the order from the center 10 (for example, by transmitting the order contained in the distribution package).

In the case of the specific example 3 of the installation and the activation, the second type target ECU is started prior to the first type target ECU. For this reason, in a case where it is desirable to simultaneously start the first type target ECU and the second type target ECU (control synchronization), measures, such as causing the second type target ECU to temporarily waiting for starting (setting a stop flag) after the first processing ends, may be taken.

Action and Advantageous Effect

As above, with the network system according to one embodiment of the present disclosure, the OTA master appropriately controls (the methods of) the installation and the activation of the update data for the ECU having the single-bank memory (the first type non-volatile memory) mounted thereon and the update data for the ECU having the dual-bank memory (the second type non-volatile memory) mounted thereon.

Specifically, the OTA master according to the present embodiment executes in advance the installation on the ECU having the dual-bank memory which has a relatively low probability of an update failure mounted thereon, executes the installation and the activation of the target ECU having the single-bank memory mounted thereon, and then executes the activation on the target ECU having the dual-bank memory mounted thereon.

By this process, even in a case where the installation and the activation on the target ECU having the single-bank memory mounted thereon fails, after it is confirmed that the installation and the activation on the target ECU having the single-bank memory mounted thereon finally succeeds, the only target ECU having the dual-bank memory that has completed the installation is activated and started. Therefore, it is possible to shorten the time until the software update is completed.

Alternatively, the OTA master according to the present embodiment executes the installation and the activation of the target ECU having the dual-bank memory mounted thereon, and then executes the installation and the activation of the target ECU having the single-bank memory mounted thereon.

By this process, in order to shorten the time until the software update is completed, when it is better to prioritize the installation and the activation of the second type target ECU over the execution of the installation and the activation of the first type target ECU, it is possible to shorten the time until the software update is completed.

As above, one embodiment of a technology of the present disclosure has been described, but the present disclosure can be regarded not only as an OTA master, but also as a method executed by the OTA master including one or more processors and one or more memories, a program, a computer-readable non-transitory storage medium storing the program, a system including the center and the OTA master, a vehicle including the OTA master, or the like.

It is possible to use the technology of the present disclosure in a network system used for updating software of an ECU.

What is claimed is:

1. An over-the-air (OTA) master comprising one or more processors configured to:
receive, from a center, first type update data for a first electronic control unit on which a first type non-volatile memory having one storage area is mounted, second type update data for a second electronic control unit on which a second type non-volatile memory having two storage areas is mounted, and an order of transference and activation of update data based on memory type, the first electronic control unit and the second electronic control unit being included in a plurality of electronic control units mounted on a vehicle; and control software update for a plurality of target electronic control units of which pieces of software are to be updated among the electronic control units mounted on the vehicle, based on the first type update data, the second type update data, and the order, the software update for the target electronic control units including:

transference and activation of the second type update data to and on the target electronic control units;

transference and activation of the first type update data to and on the target electronic control units, after performing the transference and the activation of the second type update data; and transmitting an instruction that sets a stop flag and causes the second electronic control unit on which the second type non-volatile memory is mounted to temporarily wait to start after the transference and the activation of the second type update data to and on the target electronic control units are complete and until the transference and the activation of the first type update data to and on the target electronic control units are complete such that target electronic control units start simultaneously, wherein the second electronic control unit on which the second type non-volatile memory is mounted starts after the transference and the activation of the first type update data to and on the target electronic control units are complete, and wherein the instruction that sets the stop flag is transmitted to the second target electronic control unit via an in-vehicle network after completion of the transference and activation of the second type update data, and the second target electronic control unit is configured to enter and remain in a temporary standby state in which execution of the updated software is suppressed, independently of a power supply state of the vehicle, until a release signal is received from the one or more processors after confirming completion of the transference and activation of the first type update data on the target electronic control units.

2. A system comprising:
a center including one or more first processors; and
an over-the-air (OTA) master including one or more second processors, wherein
the one or more first processors are configured to
communicate with the OTA master, and
transmit, to the OTA master, first type update data for a first electronic control unit on which a first type non-volatile memory having one storage area is mounted, second type update data for a second electronic control unit on which a second type non-volatile memory having two storage areas is mounted, and an order of transference and activation of update data based on memory type, the first electronic control unit and the second electronic control unit being included in a plurality of electronic control units mounted on a vehicle, and the one or more second processors are configured to
receive the first type update data and the second type update data transmitted from the center, and
control software update for a plurality of target electronic control units of which pieces of software are to be updated among the electronic control units mounted on the vehicle, based on the first type update data, the second type update data, and the order, the software update for the target electronic control units including:

transference and activation of the second type update data to and on the target electronic control units;

transference and activation of the first type update data to and on the target electronic control units, after performing the transference and the activation of the second type update data; and transmitting an instruction that sets a stop flag and causes the second electronic control unit on which the second type non-volatile memory is mounted to temporarily wait to start after the transference and the activation of the second type update data to and on the target electronic control units are complete and until the transference and the activation of the first type update data to and on the target electronic control units are complete such that target electronic control units start simultaneously, wherein the second electronic control unit on which the second type non-volatile memory is mounted starts after the transference and the activation of the first type update data to and on the target electronic control units are complete, and wherein the instruction that sets the stop flag is transmitted to the second target electronic control unit via an in-vehicle network after completion of the transference and activation of the second type update data, and the second target electronic control unit is configured to enter and remain in a temporary standby state in which execution of the updated software is suppressed, independently of a power supply state of the vehicle, until a release signal is received from the one or more processors after confirming completion of the transference and activation of the first type update data on the target electronic control units.

3. A method executed by an over-the-air (OTA) master, the method comprising:

receiving, from a center, first type update data for a first electronic control unit on which a first type non-volatile memory having one storage area is mounted, second type update data for a second electronic control unit on which a second type non-volatile memory having two storage areas is mounted, and an order of transference and activation of update data based on memory type, the first electronic control unit and the second electronic control unit being included in a plurality of electronic control units mounted on a vehicle; and controlling software update for a plurality of target electronic control units of which pieces of software are to be updated among the electronic control units mounted on the vehicle, based on the first type update data, the second type update data, and the order, the software update for the target electronic control units including:

transferring and activating the second type update data to and on the target electronic control units;

transferring and activating the first type update data to and on the target electronic control units, after performing the transference and the activation of the second type update data; and transmitting an instruction that sets a stop flag and causes the second electronic control unit on which the second type non-volatile memory is mounted to temporarily wait to start after the transference and the activation of the second type update data to and on the target electronic control units are complete and until the transference and the activation of the first type update data to and on the target electronic control units are complete such that target electronic control units start simultaneously, wherein the second electronic control unit on which the second type non-volatile memory is mounted starts after the transference and the activation of the first type update data to and on the target electronic control units are complete, and wherein the instruction that sets the stop flag is transmitted to the second target electronic control unit via an in-vehicle network after completion of the transference and activation of the second type update data, and the second target electronic control unit is configured to enter and remain in a temporary standby state in which execution of the updated software is suppressed, independently of a power supply state of the vehicle, until a release signal is received from the one or more processors after confirming completion of the transference and activation of the first type update data on the target electronic control units.

4. A non-transitory storage medium storing instructions that are executable by a computer of an over-the-air (OTA) master that cause the computer to execute the method according to claim 3.

5. A vehicle comprising the OTA master according to claim 1.

* * * * *